(12) United States Patent
Lieder et al.

(10) Patent No.: US 9,618,083 B2
(45) Date of Patent: Apr. 11, 2017

(54) ADJUSTMENT MECHANISM

(71) Applicant: ZF Friedrichshafen AG, Friedrichshafen (DE)

(72) Inventors: Sergej Lieder, Kassel (DE); Joerg Boerner, Friedrichshafen (DE); Robert Seidler, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 230 days.

(21) Appl. No.: 14/425,349

(22) PCT Filed: Aug. 5, 2013

(86) PCT No.: PCT/EP2013/066353
§ 371 (c)(1),
(2) Date: Mar. 3, 2015

(87) PCT Pub. No.: WO2014/037174
PCT Pub. Date: Mar. 13, 2014

(65) Prior Publication Data
US 2015/0211606 A1 Jul. 30, 2015

(30) Foreign Application Priority Data
Sep. 6, 2012 (DE) .......... 10 2012 215 775

(51) Int. Cl.
*F16H 1/32* (2006.01)
*F16H 1/46* (2006.01)
*F16H 1/28* (2006.01)

(52) U.S. Cl.
CPC ............. *F16H 1/32* (2013.01); *F16H 1/2854* (2013.01); *F16H 1/321* (2013.01); *F16H 1/46* (2013.01); *F16H 2001/324* (2013.01)

(58) Field of Classification Search
None
See application file for complete search history.

(56) References Cited

U.S. PATENT DOCUMENTS

| 4,262,556 A * | 4/1981 | Hart ............... F01B 1/0637 475/162 |
| 2011/0108354 A1* | 5/2011 | Yao ............... B62D 5/008 180/444 |

FOREIGN PATENT DOCUMENTS

| DE | 196 03 004 A1 | 7/1997 |
| DE | 197 20 255 A1 | 12/1998 |

(Continued)

OTHER PUBLICATIONS

International Search Report issued Nov. 11, 2013 in International Application No. PCT/EP2013/066353.

(Continued)

*Primary Examiner* — Justin Holmes
*Assistant Examiner* — Timothy M Hannon
(74) *Attorney, Agent, or Firm* — Brinks Gilson & Lione

(57) ABSTRACT

The invention relates to an adjustment mechanism that includes a set ring gears which are arranged coaxially towards a central axis and which each include a cylindrical toothing system, two eccentric wheels with beveloid gears which mesh with the cylindrical toothing systems of the ring gears, eccentric axes which are inclined at an angle towards the central axis, and a central shaft that is driven by a drive shaft onto which the eccentric wheels are mounted. The set of ring gears include a center ring gear that is circulating and two outer neighboring ring gears which are solidly fixed.

20 Claims, 5 Drawing Sheets

(56) References Cited

FOREIGN PATENT DOCUMENTS

| | | |
|---|---|---|
| DE | 197 56 967 A1 | 6/1999 |
| DE | 199 07 912 A1 | 8/1999 |
| EP | 0 861 995 A2 | 9/1998 |
| WO | 2006/066985 | 6/2006 |

OTHER PUBLICATIONS

International Search Report issued Nov. 11, 2013 in International Application No. PCT/EP2013/066353 (German Language).

* cited by examiner

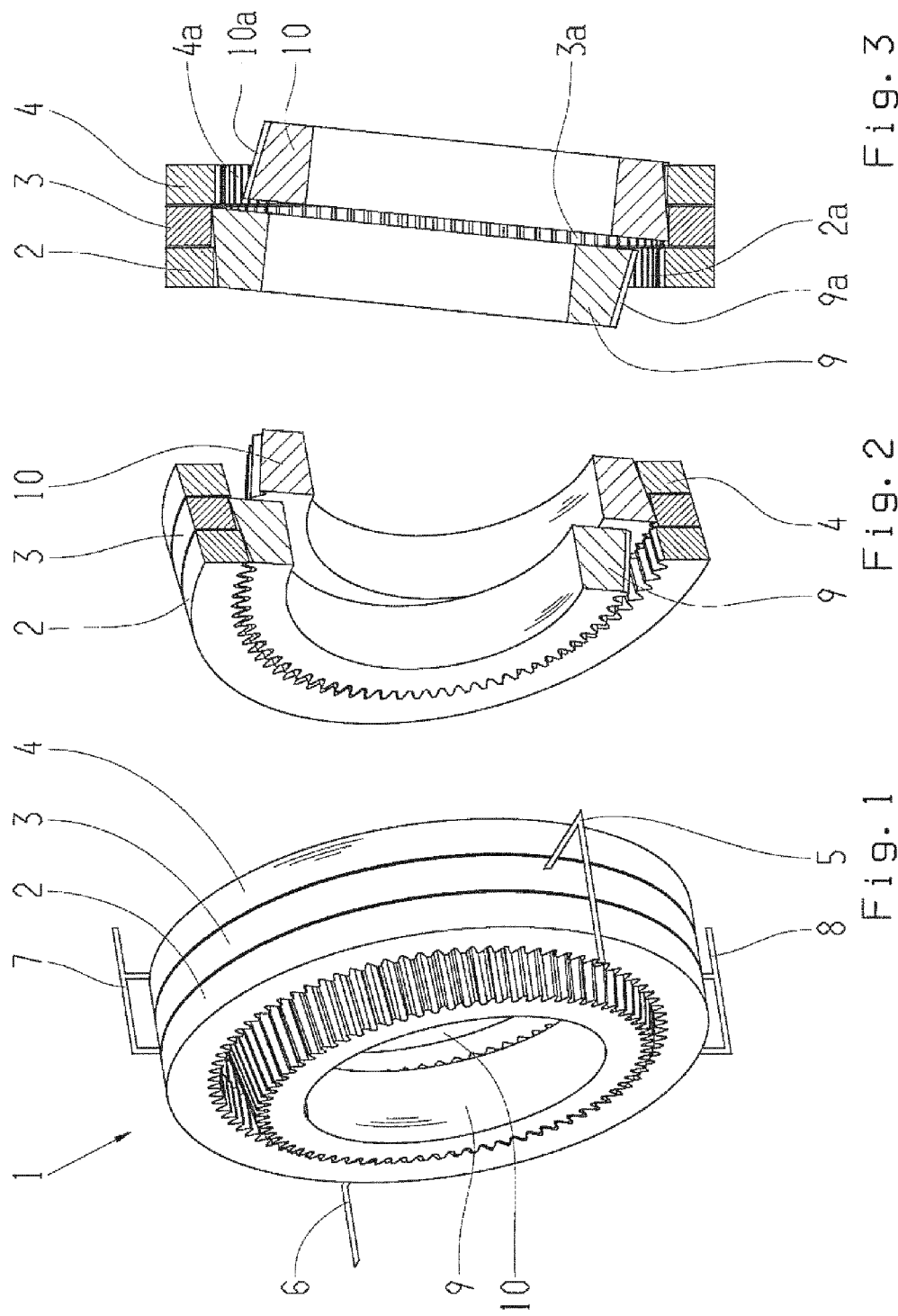

ADJUSTMENT MECHANISM

This application is a filing under 35 U.S.C. §371 of International Patent Application PCT/EP2013/066353, filed Aug. 5, 2013, and claims the priority of German Patent Application DE 10 2012 215 775.1, filed Sep. 6, 2012. These applications are incorporated by reference herein in their entirety.

The present disclosure relates to an adjustment mechanism, which is based on the so-called Wolfrom gear.

A Wolfrom gear is understood to be a reduced planetary gear, by means of which high speed reducing ratios with a compatible overall efficiency factor can be achieved, and which can also be used as an adjustment mechanism.

Such a Wolfrom gear is known from DE 195 25 831 A1 of the applicant. The drive mechanism is accomplished via a central shaft with a small central gear, which is in gear engagement with several planetary gears, which in turn are meshed with a first solidly fixed ring gear and a second circulating ring gear which is designed as the drive mechanism.

An epicyclic gear is known from DE 10 2011 078 130 A1, which consists of a set of three cylindrical ring gears as well as two eccentric wheels with beveloid gears with angled eccentric axes as well as a central shaft. The beveloid gears of the eccentric wheels hereby mesh with the cylindrical toothing system of the ring gears. This epicyclic gear is characterized in that the center gear of the three ring gears is solidly fixed and the two outer ring gears are circulating and are coupled with each other. The disadvantage of this epicyclic gear has proved to be that the entire load is resting on the center ring gear.

Thus, it is the task of the present disclosure to present an adjustment mechanism, by means of which a load distribution can be guaranteed.

This task is accomplished with the adjustment mechanism according to the present disclosure. Preferred embodiments of the present disclosure result from the claims.

According to the present disclosure, an adjustment mechanism is intended, which comprises a set of three cylindrical ring gears and two eccentric wheels with beveloid gears with angled eccentric axes as well as a central shaft. The two eccentric wheels with beveloid gears are mounted onto the central shaft and comprise different respective rotational axes. The beveloid gears of the eccentric wheels hereby mesh with the cylindrical toothing system of the ring gears. The present disclosure is characterized in that the set of ring gears comprise a center ring gear that is circulating and two outer neighboring ring gears which are solidly fixed.

A beveloid toothing system is understood to be a tapered or conical spur gear arrangement. The adjustment mechanism according to the present disclosure comprises the following advantages: There is a very low pressing due to the convex-concave contact of the gear teeth. Since there is a large overlapping for each engagement (>4), it is possible to achieve high output torque. The large overlapping results in a gradual load transmission, which is also associated with low noise excitation. The small amount of necessary parts allows for high transmission ratios. There is only little gliding motion and thus little loss due to the gearing system. Further, the load is distributed onto the two outer ring gears which are solidly fixed.

Due to a preferred embodiment, the first eccentric wheel engages with the centrally circulating ring gear, and also with the first solidly fixed ring gear. The second eccentric wheel engages with the center ring gear that circulating, as well as with the second solidly fixed ring gear. Thus, both eccentric wheels with beveloid gears roll off onto the first or second solidly fixed ring gear and respectively propel the center ring gear, which forms a common gear element. This results in a load distribution onto both outer solidly fixed ring gears. Further, a compact structure and a high overlapping can be accomplished, since there is no big difference in the amount of the teeth of the ring gears and of the eccentric wheels with beveloid gears.

According to another preferred embodiment, the gear engagements of the first eccentric wheel and of the second eccentric wheel are arranged diametrically opposite of each other, which is in reference to the central axis. The resulting advantage is that the radial load of the central shaft and of the ring gears is relatively low.

According to a further preferred embodiment, the two outer solidly fixed ring gears are supported, so that they cannot twist, in particular that the two outer ring gears twist towards each other as well as towards the center ring gear that is circulating.

According to a further preferred embodiment, the central shaft, on which the eccentric wheels with beveloid gears are running, is arranged as the input drive, while the center ring gear that is circulating serves as the output. This results in a high speed reducing ratio, which also means a high output torque.

According to a further preferred embodiment, a spring element, which operates in axial direction, is arranged between the two eccentric wheels with beveloid gears. By means of this suspension spring in the two eccentric wheels with beveloid gears, it is possible to accomplish a condition that is free from any backlash: The transmission thus runs without any backlash as long as there is little load, and when there is a load, the torsional backlash is more or less depending on the stiffness of the spring element.

According to a further preferred embodiment, the central shaft can be designed as a ring gear. This results in a compact coaxial structure with the possibility for a central drive-through shaft.

In a further preferred embodiment, a planetary gear stage is preferably arranged upstream from the central shaft. The sun gear of the planetary gear stage is connected to the drive shaft and the shaft of the planetary gear is connected to the central shaft. The central shaft is advantageously supported on the planetary gear and on a solidly fixed ring gear. But, in another preferred embodiment it is also possible that the central shaft is supported on both solidly fixed ring gears.

In a further preferred embodiment, there is a spur-wheel stage which is preferably arranged upstream from the central shaft, with at least a double-staged spur-wheel, whereby the spur-wheel is connected to a solidly fixed ring gear in a stationary way. Advantageously it is possible to use further double-staged spur-wheels for load distribution.

The adjustment mechanism has a swivel range of less than 360 degrees with reference to the rotation of the output ring gear (center ring gear). This limitation is the result of the outer support of the two outer ring gears that are solidly fixed (not moving). It is e.g. possible to use the epicyclic gear as a drive for a flab actuator of winged planes. Finally, the epicyclic gear according to the present disclosure can also be used as a drive for seat actuators. The use is hereby not limited to aviation, but can also be used in seat actuators of motor vehicles.

An embodiment of the present disclosure is depicted in the drawings and will be explained in more detail in the following, whereby further characteristics and/or advantages can be derived from the description and/or from the drawings. It is shown:

FIG. 1 illustrates an epicyclic gear in a 3D-depiction;

FIG. 2 illustrates the epicyclic gear according to FIG. 1 in half-section in a 3D-depiction;

FIG. 3 illustrates the epicyclic gear in an axial section with ring gears and eccentric wheels with beveloid gears;

Figure 4:
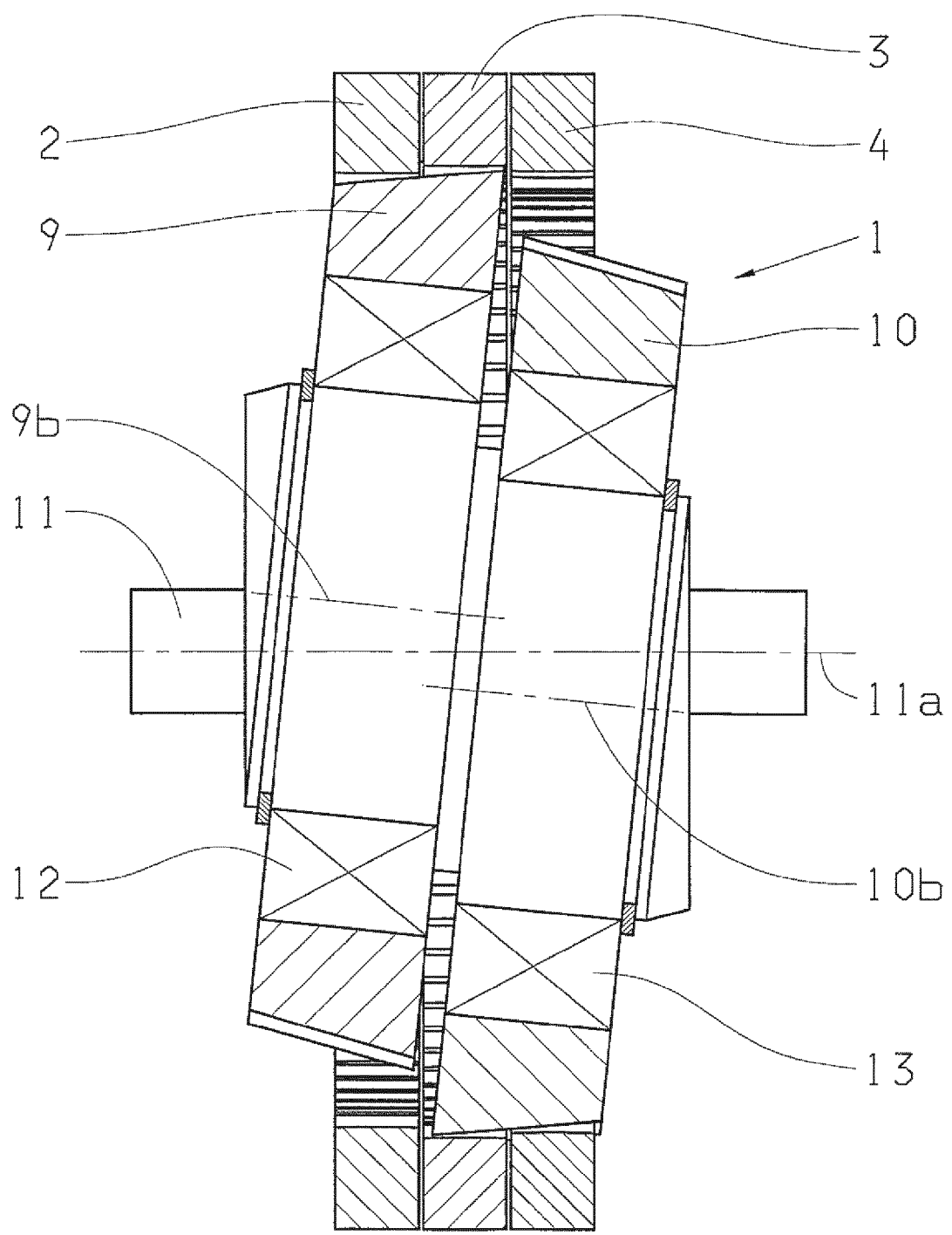
FIG. 4 illustrates the epicyclic gear with ring gears and eccentric wheels with beveloid gears which are mounted on the central shaft in axial section.

FIG. 1 depicts an epicyclic gear 1 which consists of a set of three disc-like shaped ring gears 2, 3, 4, which are arranged next to each other. The center ring gear 3 is designed as a circulating wheel. The two outer ring gears 2, 4 are designed as fixed wheels and are locally supported. The two outer ring gears are hereby connected to each other by means of two brackets 7, 8 which are arranged diametrically opposite of each other. The two eccentric wheels 9, 10 with beveloid gears (here without reference number) are arranged inside of the ring gears 2, 3, 4, which feature a cylindrical inner tooth system (here without reference number).

FIG. 2 depicts the epicyclic gear 1 in 3D-depiction in a half-section. It can be derived from this sectional depiction, that the first eccentric wheel 9 with its beveloid gears is in mesh with the cylindrical inner tooth system of the first solidly fixed ring gear 2 and with the circulating ring gear 3, while the second eccentric wheel 10 with its beveloid gears is in mesh with the second solidly fixed ring gear 4 and with the circulating ring gear 3.

In FIG. 3, the cylindrical inner tooth system 2a, 3a, 4a of ring gears 2, 3, 4 can be seen on the one hand, and on the other hand also the beveloid gears 9a, 10a of the eccentric wheels. The gear engagement 9a, 2a, 3a of the first eccentric wheel 9 and the gear engagement 10a, 3a, 4a of the second eccentric wheel 10 are located—as it can be seen in the sectional depiction—within the drawing level, which means that they are arranged diametrically opposite of each other. This results in a low radial load for the ring gears 2, 3, 4.

FIG. 4 depicts an enlarged axial section of the epicyclic gear 1 with a central shaft 11, which consists of a central axis 11a. The two eccentric wheels 9, 10 are eccentrically mounted on central shaft 11 via bearings 12, 13. Eccentric wheels 9, 10 feature eccentric axes 9b, 10b, which are arranged in a respective angle with regards to the central axis 11a.

The propulsion of epicyclic gear 1, which can also be described as Wolfrom gear, is performed via central shaft 11, while the output is accomplished via the center ring gear 3 that is circulating. Due to the incline of the eccentric axes 9b, 10b, it is possible that the gear engagements of the two eccentric wheels 9, 10 to the circulating ring gear 3 are situated diametrically opposite. On the one hand, both eccentric wheels 9, 10 roll off onto the solidly fixed ring gears 2, 4 and on the other hand they are engaged to the circulating ring gear 3, by means of which the output is propelled.

According to a preferred embodiment, a transmission ratio of i=33 is intended for the epicyclic gear, which means the ratio between the rotations of the input-central shaft 11 and of the output ring gear 3. The amount of gear teeth of the output ring gear 3 amounts to—due to the two oppositely located gear engagements—the double of the transmission ratio i, which is 66. The solidly fixed ring gears 2, 4 respectively comprise teeth of which number is two less than that of the circulating ring gear 3, which is 64. The beveloid gears 9a, 10a of the eccentric wheels 9, 10 comprises slightly fewer teeth than the solidly fixed ring gears 2, 4. In this way it is possible to achieve a very effective transverse contact ratio and thus also a great overload protection.

Central shaft 11 can also be designed as a ring gear—which is not depicted.

By means of the pairing of the cylindrical ring gears 2, 3, 4 with the eccentric wheels 9, 10, which run on the inclined axes 9b and 10b, it is possible to adjust the axial distance of the eccentric wheels 9, 10 so that there is no backlash: If a spring element (not depicted) is inserted as an axial support between the eccentric wheels 9, 10, the epicyclic gear 1 runs without any backlash as long as there is little load, and when there is a load, the torsional backlash is more or less depending on the stiffness of the spring element.

Figure 5:
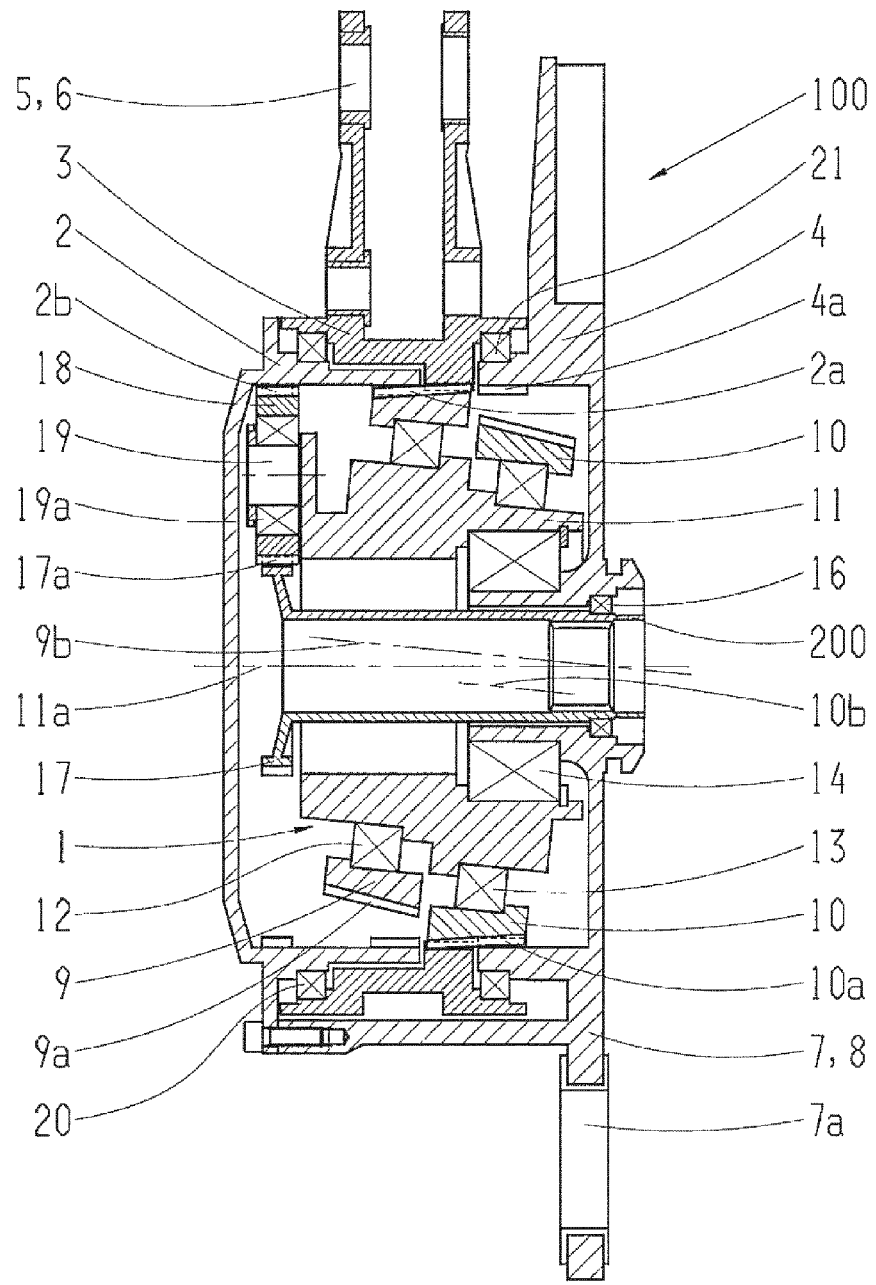
FIG. 5 illustrates a longitudinal section of an adjustment mechanism according to the present disclosure with a planetary gear stage in a first embodiment.

FIG. 5 depicts a longitudinal section through an adjustment mechanism 100 with an epicyclic gear that is driven by a planetary gear stage, as it is explained in the FIGS. 1 to 4. The adjustment mechanism basically comprises the central shaft 11 and of the two eccentric wheels 9, 10 which are arranged onto the central shaft 11 by means of bearings 12, 13. The planetary gear stage consists of a sun gear 17, which is solidly connected to drive shaft 200. Drive shaft 200 is rotatably mounted on central axis 11a via bearing 16, whereby bearing 16 is supported on the first solidly fixed ring gear 4. Thus, drive shaft 200 is guided by the entire epicyclic gear.

The toothing system 17a of sun gear 17 of the planetary gear stage is meshing with the toothing system 18a of one planetary gear 18. FIG. 5 is merely depicting one planetary gear 18. Usually, one planetary gear stage consists of at least 3 planetary gears, where all planetary gears 18 would then be meshing with sun gear 17. The toothing system 18a of planetary gear 18 or of the planetary gears continues to be engaged with the internal toothing system 2b of the second solidly fixed ring gear 2. The planetary gear stage, which consists of sun gear 17 and the planetary gears 18, is thus arranged into the second solidly fixed ring gear 2 in such a way, that the planetary gear stage can rotate around central axis 11a.

A shaft 19 is located inside planetary gear 18, which is rotatably mounted into planetary gear 18 via bearing 19a. The shaft 19 is solidly connected to a central shaft 11. Since the toothing system 18a of planetary gear 18 is engaged with the inner toothing system 2b of the second solidly fixed ring gear 2 and is thus supported on ring gear 2, the turning of the drive shaft 200 and the connected rotation of planetary gear 18 is moving the central shaft 11.

The central shaft 11 is supported on the first solidly fixed ring gear 4 by means of a first bearing 14 and can thus rotate around central axis 11a. The central shaft 11 is further supported on shaft 19 of planetary gear 18.

The first eccentric wheel 9 is supported on the outer contour of the central shaft 11 via a bearing 12. Equally, the second eccentric wheel 10 is supported on the outer contour of the central shaft 11 via a further bearing 13.

A toothing system 9a of the first eccentric wheel 9 is engaged with the inner toothing system 2a of the second solidly fixed ring gear 2 as well as the inner toothing system 3a of the rotatably mounted center ring gear 3. The first eccentric wheel 9 is hereby arranged in such a way that it can rotate around swivel axis 9b.

A toothing system 10a of the second eccentric wheel 10 is engaged with the inner toothing system 4a of the first solidly fixed ring gear 4 as well as with the inner toothing system 3a of the rotatably mounted center ring gear 3. The second eccentric wheel 10 is hereby arranged in such a way that it can rotate around swivel axis 10b.

The two outer solidly fixed ring gears 2, 4 are connected to each other by means of brackets 7, 8. By means of a stud 7a, which is connected to brackets 7, 8, it is assured that ring gears 2, 4 are mounted in a way that they cannot rotate. Appropriately, brackets 7, 8 are arranged diametrically opposite of one another (not depicted).

The center ring gear 3 is mounted in such a way that it can rotate around central axis 11a, whereby it is supported on the outer contour of the two outer solidly fixed ring gears 2, 4 via two bearings 20, 21. By means of the turning of the center ring gear 3, it is possible to turn studs 5, 6, by means of which for example a push rod of a subsequently arranged landing flap of an airplane can be adjusted (not depicted).

FIG. 5 depicts only one stud 5, 6. But it is also possible that there are two studs 5, 6, which are arranged diametrically opposite to each other. The alignment of studs 5, 6 and of bracket 7, 8 is constructed in such a way that a 360 degree turn of studs 5, 6 is not possible. The diametrically opposite studs 5, 6 and brackets 7, 8 for example are arranged at a respective 90 degree offset towards each other in circumferential direction. This results in a swivel range of the studs 5, 6 of approximately 70 degrees twisting angle in both directions.

Figure 6:
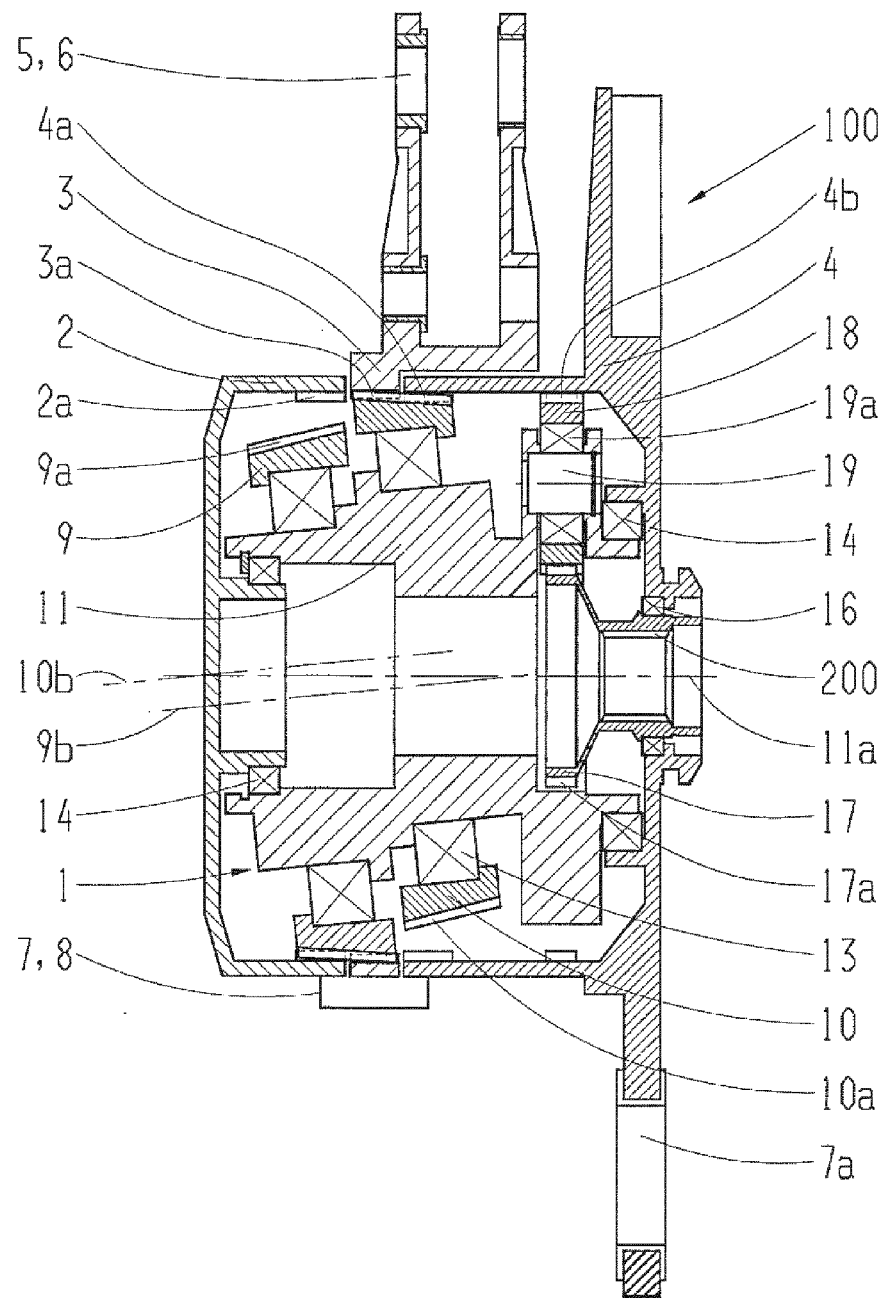
FIG. 6 illustrates a longitudinal section of an adjustment mechanism according to the present disclosure with a planetary gear stage in a second embodiment.

FIG. 6 depicts a longitudinal section through an adjustment mechanism 100 with an epicyclic gear that is driven by a planetary gear stage according to the depictions of FIG. 5. In contrast to FIG. 5, the planetary stage here is not arranged inside the second solidly fixed ring gear 2, but rather inside the first solidly fixed ring gear 4. The planetary gear stage consists of a sun gear 17, which is solidly connected to a drive shaft 200, whereby the drive shaft 200 is rotatably mounted on a central axis 11a via a bearing 16, and whereby the bearing 16 is supported on the first solidly fixed ring gear 4. In contrast to the embodiment in FIG. 5, the drive shaft 200 is not guided by epicyclic gear 1 or by central shaft 11.

The toothing system 17a of the sun gear 17 of the planetary gear stage is meshing with the toothing system 18a of one planetary gear 18. An inner toothing system 4b of the first solidly fixed ring gear 4 is meshing with the toothing system 18a of the planetary gear 18. In this way it can be assured that the planetary gear stage is arranged inside the first solidly fixed ring gear 4, in such a way that it can turn.

The planetary gear 18 is mounted on a shaft 19, which is rotatably mounted inside of the planetary gear 18 via the bearing 19a. The shaft 19 is connected to the central shaft 11, whereby the central shaft 11 is supported on the first solidly fixed ring gear 4 via a first bearing 14 and on the second solidly fixed ring gear 4 via a second bearing 14a, so that the central shaft 11 can be rotated around the central axis 11a.

The two solidly fixed ring gears 2, 4 are connected to each other by means of brackets 7, 8. The center ring gear 3 is connected to studs 5, 6. According to the depictions for FIG. 5, there are appropriately two diametrically opposite brackets. The center ring gear 3 consists of two studs 5, 6 which are arranged parallel to each other, in order to operate the adjustment mechanism. According to the depictions in FIG. 5 to FIG. 7, brackets 7, 8 limit the swivel range of studs 5, 6 to less than 360 degrees. The diametrically opposite studs 5, 6 and brackets 7, 8 for example are arranged at a respective 90 degree offset towards each other in circumferential direction. This results in a swivel range of the studs 5, 6 of approximately 70 degrees twisting angle in both directions.

The alignment of the two eccentric wheels 9, 10 with the central shaft 11 as well as the meshing of the toothing system 9a, 10a of the two eccentric wheels 9, 10 with the inner toothing system 2a, 3a, 4a of the ring gears 2, 3, 4 corresponds to the embodiments in FIG. 5.

Figure 7:
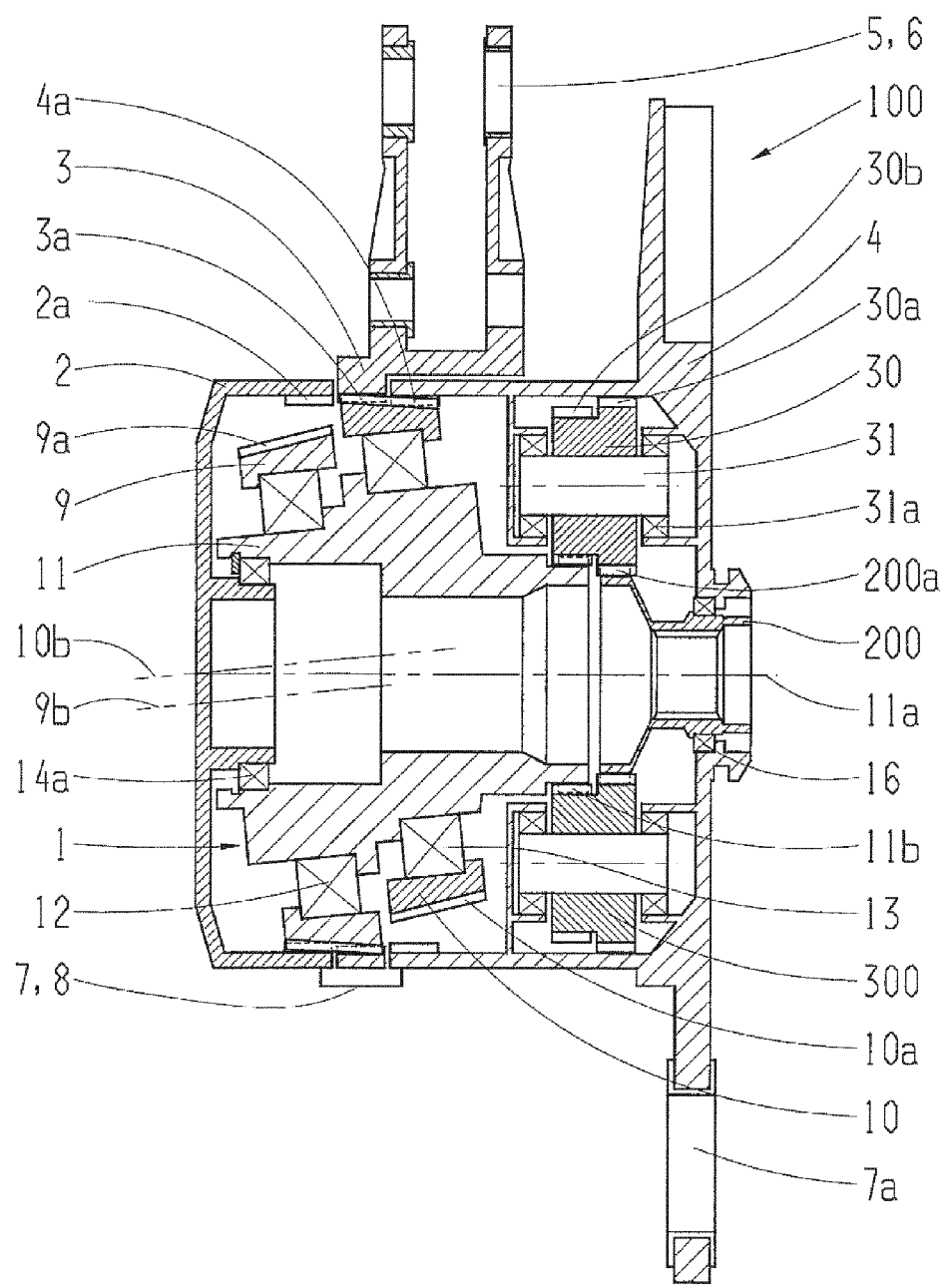
FIG. 7 illustrates a longitudinal section of an adjustment mechanism according to the present disclosure with a double-staged spur wheel stage.

FIG. 7 depicts a longitudinal section through an adjustment mechanism 100 with a central shaft that is being driven by a double-staged spur-wheel. Just like it is depicted in FIG. 5 and FIG. 6, the epicyclic gear is formed by means of central shaft 11 and the two eccentric wheels 9, 10 and basically corresponds to a beveloid-Wolfrom-wobble-gear.

A drive shaft 200 is engaged to a spur-wheel 30 and a first toothing system 30a of the first stage of the spur-wheel 30 is meshing with a toothing system 200a of the drive shaft 200. The spur-wheel 30 is arranged onto a shaft 31, which is supported on the first solidly fixed ring gear 4 via a bearing 31a. In this way, it can be assured that the spur-wheel 30 is fixed and can rotate with regard to the first solidly fixed ring gear 4. In contrast, the planetary wheel 18 according to FIG. 5 and FIG. 6 is arranged in a way that it can circulate. The second toothing system 30b of the second stage of spur-wheel 30 is meshing with a toothing system 11b of the central shaft 11. The double-staged spur-wheel 30 can be made out of one single piece, which carries both toothing systems 30a, 30b, or it can be made out of two separate pieces, whereby one piece consists of the first toothing system 30a and another piece consists of the second toothing system 30b. Appropriately, both toothing systems 30a, 30b consist of a different amount of teeth.

A second spur-wheel 300 is indicated in FIG. 7, which is symmetrical to the first spur-wheel. It is thus possible to distribute the load onto two spur-wheels. It is also possible to intend further spur-wheels, so that the load for each spur-wheel can be reduced even more.

In this form, the central shaft 11 is supported on the second solidly fixed ring gear 2 via bearing 14a, but also on spur-wheel 30.

The first eccentric wheel 9 is supported on the outer contour of the central shaft 11 via a bearing 12. In like manner, the second eccentric wheel 10 is supported on the outer contour of the central shaft 11 via a further bearing 13.

The toothing system 9a of the first eccentric wheel 9 is meshing with the inner toothing system 2a of the second solidly fixed ring gear 2 as well as with the inner toothing system 3a of the rotatably mounted center ring gear 3. The eccentric wheel 9 is aligned in such a way that it can rotate around rotation axis 9b. The toothing system 10a of the second eccentric wheel 10 is meshing with the inner toothing system 4a of the first solidly fixed ring gear 4 as well as with the inner toothing system 3a of the rotatably mounted center ring gear 3. The eccentric wheel 10 is aligned in such a way that it can rotate around rotation axis 10b. The engagements of the toothing systems 9a, 10a of the two eccentric wheels 9, 10 to the inner toothing system 3a of the center ring gear 3 are located diametrically opposite of each other, just like in the embodiments in FIGS. 5 and 6.

The two outer solidly fixed ring gears 2, 4 are connected to each other by means of brackets 7, 8. By means of a stud 7a, which is connected to brackets 7, 8, it is assured that ring gears 2, 4 are mounted in a way that they cannot rotate.

When the transmission ratios of the planetary stage in FIG. 5 or FIG. 6 as well as the transmission ratio of the spur-wheel stage in FIG. 7 are multiplied with the transmission ratio of the epicyclic gear from FIGS. 1 to 4 or also depicted in FIGS. 5 to 7, it results in the transmission ratio of the adjustment mechanism 100. It is possible to achieve transmission ratios of up to i–200 and more.

REFERENCE SYMBOLS

1 Epicyclic gear
2 second solidly fixed ring gear
2a toothing system of the second solidly fixed ring gear for the eccentric wheel with beveloid gears
2b toothing system of the second solidly fixed ring gear for the planetary gear stage
3 circulating ring gear
3a toothing system of the circulating ring gear
4 first solidly fixed ring gear
4a toothing system of the first solidly fixed ring gear for the eccentric wheel with beveloid gears
4b toothing system of the first solidly fixed ring gear for the planetary gear stage
5 stud
6 stud
7 bracket
7a stud connected to bracket
8 bracket
9 eccentric wheel
9a beveloid gears
9b eccentric axis
10 eccentric wheel
10a beveloid gears
10b eccentric axis
11 central shaft
11a central axis
12 bearing for an eccentric wheel
13 bearing for an eccentric wheel
14 first bearing for a central shaft
14a second bearing for a central shaft
16 bearing for a drive shaft
17 sun gear
17a toothing system of the sun gear
18 planetary gear
18a toothing system of the planetary gear
19 shaft of the planetary gear
19a bearing for the shaft of the planetary gear
20 first bearing for the center ring gear
21 second bearing for the center ring gear
30 first spur-wheel
30a toothing system of the spur-wheel
31 shaft of the spur-wheel
31a bearing for the shaft of the spur-wheel
100 adjustment mechanism
200 drive shaft
200a toothing system of the drive shaft
300 second spur-wheel

The invention claimed is:

1. An adjustment mechanism comprising:
a set of ring gears arranged coaxially towards a central axis and the ring gears each comprising a cylindrical toothing system;
first and second eccentric wheels each comprising beveloid gears meshing with the cylindrical toothing systems of the ring gears, and eccentric axes of the first and second eccentric wheels being inclined at an angle relative to the central axis; and
a central shaft driven by a drive shaft on which the first and second eccentric wheels are mounted, wherein the set of ring gears comprise a center ring gear that is circulating and first and second outer ring gears which are solidly fixed.

2. The adjustment mechanism according to claim 1, wherein the first eccentric wheel is in mesh with the first outer ring gear and with the center ring gear, and the second eccentric wheel is in mesh with the second outer ring gear and with the center ring gear.

3. The adjustment mechanism according to claim 2, wherein the first and second outer ring gears are connected to each other by brackets.

4. The adjustment mechanism according to claim 3, wherein the brackets are arranged diametrically opposite of each other and prevent rotation of the first and second outer ring gears, and the center ring gear is rotatably supported on the first and second outer ring gears.

5. The adjustment mechanism according to claim 3, wherein the center ring gear further comprises at least two studs, and the brackets limit a swivel range of the studs to less than 360° degrees.

6. The adjustment mechanism according to claim 5, wherein the studs and the brackets are arranged at a 90° degree offset toward each other in a circumferential direction.

7. The adjustment mechanism according to claim 1, wherein the gear engagements of the first and second eccentric wheels are arranged diametrically opposite of each other with reference to the central axis.

8. The adjustment mechanism according to claim 1, wherein the central shaft is arranged as an input drive, and the center ring gear that is circulating around the central axis and that serves as an output.

9. The adjustment mechanism according to claim 1, wherein a spring element is arranged between the first and second eccentric wheels, and the spring element operates in an axial direction.

10. The adjustment mechanism according to claim 1, wherein the central shaft is designed in form of a ring gear.

11. The adjustment mechanism according to claim 1, wherein there is a planetary gear stage, whereby a sun gear of the planetary gear stage is connected to the drive shaft, and a planetary gear of the planetary gear stage is connected to the central shaft via a planetary shaft.

12. The adjustment mechanism according to claim 11, wherein the central shaft is supported on the planetary gear and on at least one of the first and second outer ring gears.

13. The adjustment mechanism according to claim 11, wherein the central shaft is supported on both the first and second outer ring gears.

14. The adjustment mechanism according to claim 1, wherein there is a spur-wheel stage comprising at least one double-staged spur-wheel, and the spur-wheel is supported on one of the first and second outer ring gears so as to rotate.

15. The adjustment mechanism according to claim 14, wherein the central shaft is supported on the second outer ring gear and said at least one double-staged spur-wheel.

16. The adjustment mechanism according to claim 15, wherein the first and second outer ring gears are supported on an outer contour of the central shaft by corresponding bearings.

17. An adjustment mechanism comprising:
at least three ring gears comprising a center ring gear and first and second outer ring gears and being coaxially arranged relative to a central axis;

at least two eccentric wheels each comprising beveloid teeth meshing with teeth of one of the first and second outer ring gears and also meshing with teeth of the center ring gear serving as an output gear; and a central shaft on which said at least two eccentric wheels are eccentrically mounted, the central shaft serving as an input shaft, wherein the first and second outer ring gears are solidly fixed by a bracket, and the center ring gear circulates around the central axis, and gear engagements of the two eccentric wheels to the center ring gear are situated diametrically opposite each other.

18. An adjustment mechanism comprising:

at least three ring gears comprising a center ring gear and first and second outer ring gears and being coaxially arranged relative to a central axis;

at least two eccentric wheels each comprising beveloid teeth meshing with teeth of one of the first and second outer ring gears and also meshing with teeth of the center ring gear serving as an output gear;

a planetary gear set comprising:

a sun gear solidly connected to a drive shaft; and planetary gears rotatably mounted on a planetary shaft thereof, the planetary gears engaged with the sun gear and the teeth of one of the first and second outer ring gears; and a central shaft on which said at least two eccentric wheels are eccentrically mounted, the shaft of the planetary gears solidly connected to the central shaft rotatably mounted on one of the first and second outer ring gears, wherein the first and second outer ring gears are solidly fixed by a bracket, and the center ring gear circulates around the central axis, and gear engagements of the two eccentric wheels to the center ring gear are situated diametrically opposite each other.

19. The adjustment mechanism according to claim 18, wherein the planetary gear set is arranged inside of the first outer ring gear, and the central shaft is rotatably mounted on the second outer ring gear.

20. The adjustment mechanism according to claim 18, wherein the planetary gear set is arranged inside of the second outer ring gear, and the central shaft is rotatably mounted on the first outer ring gear.

* * * * *